Feb. 24, 1942.   B. D. DAVIES   2,273,837
FAUCET CONNECTOR
Filed Dec. 7, 1939

INVENTOR.
BEDFORD D. DAVIES
BY
ATTORNEY.

Patented Feb. 24, 1942

2,273,837

UNITED STATES PATENT OFFICE 2,273,837

FAUCET CONNECTOR

Bedford D. Davies, Jamaica, N. Y.

Application December 7, 1939, Serial No. 307,966

5 Claims. (Cl. 285—90)

This invention relates to new and useful improvements in faucet connectors, and particularly relates to a detachable connector for coupling tubes, hose, sprays, etc., to the discharge ends or nozzles of faucets, valves and the like. The invention proposes the construction of a faucet connector as mentioned which may be quickly, conveniently, and efficiently attached to the discharge end or nozzle of a faucet or valve.

As a dominating object, this invention proposes to so construct the faucet connector that it may be quickly and easily adapted to engage tightly on nozzles of faucets, valves and the like of varying sizes, even when such nozzles are particularly short, or of unusual sectional shape.

More specifically, this invention contemplates characterizing the faucet connector by a hollow tapering body adapted to have attached to it, at its bottom end, a tube or hose, and which is to be provided at its top end with an enclosing wall, of a flexible elastic material, having an opening into which the nozzle of a faucet or valve may engage, and said enclosing top wall to be provided with a plurality of slightly spaced ridges concentric around said opening, with the innermost ridge adjacent the edge of the opening for assisting in gripping the nozzle of said faucet or valve.

Still further the invention proposes to so construct the faucet connector that the hollow tapering body previously mentioned may be integral with the top wall, or the hollow tapering body may be of separate material, elastic or non-elastic, and merely attached to the top wall.

Still further the invention contemplates to so construct the top wall that the faucet connector will be firmly connected with the nozzle of the faucet or valve, and be held against the pressure of liquid flowing through these parts without recourse to any supplementary attachment or appliances, and without troublesome manipulation of the connector to obtain such a grip as is the case with other devices of this class now in use.

Another object of the invention is to so design the concentric ridges of the top wall previously mentioned that they may be located either upon the top face of the top wall, or on the bottom face of the top wall, or on both of the faces. It is proposed that when the ridges are located on both of the faces that they be accurately aligned with each other so that the ridges at the top and at the bottom are substantially continuous through the wall.

Still further the invention proposes to arrange the ridges previously mentioned so as to flare outward from the bottom to the top to facilitate engagement of the faucet connector on the nozzle of a faucet or valve.

Another one of the objects of this invention is to so arrange the top wall that, when desired, the innermost ridge may be cut out, by cutting through the material of the top wall between this ridge and the adjacent ridge, and in this manner the opening in the top wall of the connector may be increased to adapt the connector to the nozzles of faucets and valves of larger size.

It should be noted that with the construction of the faucet connector in accordance with this invention, the means for engaging the faucet or valve nozzle is at the extreme top so as to be readily engageable upon short nozzles. This is an important advantage over prior constructions in which the means for engaging the faucet is somewhat below the top, requiring the nozzle to be long enough to enter a relatively deep opening.

The construction contemplated, in accordance with this invention, is such that the faucet connector may comprise a single body of flexible elastic material molded in one piece, with all parts integral. While this is an important feature, and desirable, it must be borne in mind that the faucet connector may be varied by forming the top ridged section alone of flexible elastic material, with the body and bottom portion of other materials, with the several parts suitably joined together for the purpose of conveying liquids to a tube or hose as before mentioned.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Figure 1:
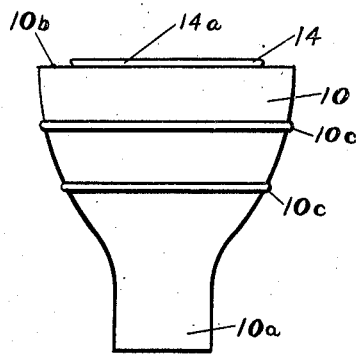
Fig. 1 is a side elevational view of a faucet connector constructed in accordance with this invention.
Figure 3:
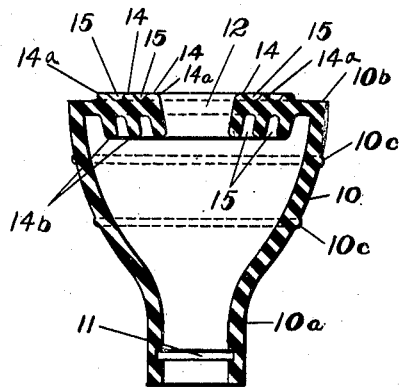
Fig. 3 is a vertical sectional view taken on the line 3—3 of Fig. 2.
Figure 2:
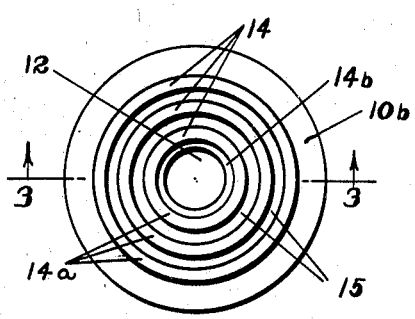
Fig. 2 is a plan view of Fig. 1.

The faucet connector, in accordance with this invention, includes a hollow tapering body 10 adapted to be attached to a tube or hose at its bottom end 10a. The body 10 tapers from the top to the bottom end so that the bottom end 10a is of a size facilitating its connection with a tube or hose. This bottom end 10a is provided with an internal groove 11 formed on its inner face adapted to receive and hold the flange of a pipe connector. Such pipe connector is not shown on the drawing since it forms no part of this invention and similar devices are generally known in the art. The tubular bottom portion 10a is also adapted to be connected with the usual hose couplings and tube couplings generally used with faucet or similar connectors.

A flexible elastic material top wall 10b is extended across the top of the hollow tapering body 10. In the preferred form of the invention illustrated in the drawing, this top wall 10b and the hollow tapering body are integral. Consequently, the hollow tapering body 10 is constructed of the same flexible elastic material from which the top wall is made. The top wall 10b is provided with an opening 12, preferably centrally located, into which the end of a faucet or valve nozzle may engage. A plurality of slightly spaced ridges 14 are arranged concentrically about the opening 12 with the innermost ridge adjacent the edge of the opening for assisting in gripping a faucet or valve nozzle.

The particular ridges 14 illustrated in the drawing have top portions 14a located above the wall 10b and bottom portions 14b located below the wall 10b. These top and bottom portions are aligned with each other so that the ridges at the top are in effect continuations from the ridges at the bottom. With this arrangement there are recessed or grooved areas 15 between the ridges 14 exposing the material of the top wall 10b between adjacent ridges.

The concentric ridges 14 are flared outward from the bottom to the top. This facilitates engagement of the connector upon the nozzle of a faucet or valve. The connector is merely placed against the bottom of the nozzle and forced upward so that the innermost ridge 14 tightly engages and grips the outer face of the nozzle. The material of the top wall 10b at the recessed areas 15 is relatively soft and may easily compress so that the outer ridges 14 assist the innermost ridge 14 in applying pressure to the nozzle to insure a tight grip and thus hold the faucet connector under the various pressures encountered by the passage of liquids through the nozzle and through the connector.

When it is desired to engage the faucet connector on the nozzles of faucets or valves of diameters so large than the faucet connector cannot be pushed upward into position, the innermost annular ridge 14 may be cut out by cutting through the top wall 10b at the recessed area 15 located between the innermost ridge 14 and the next adjacent ridge 14. In this manner the size of the central opening of the faucet connector is increased and so the connector may be adapted to nozzles of larger diameter.

The annular beads 10c illustrated on the sides of the body 10 are mainly for decorative purposes, though they also serve to reinforce and strengthen the side walls of the body.

Figure 5:
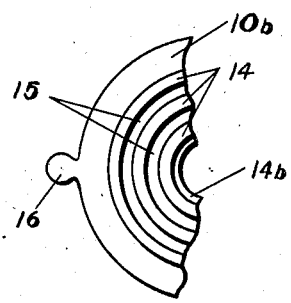
Fig. 5 is a fragmentary elevational view looking in the direction of the line 5—5 of Fig. 4.
Figure 4:
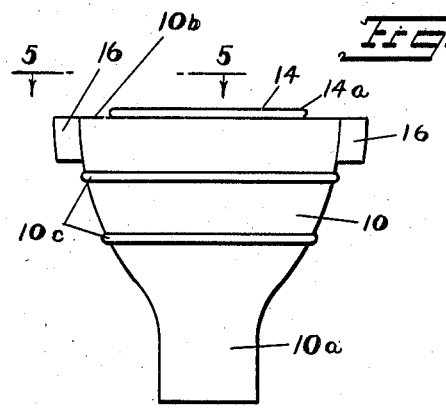
Fig. 4 is a side elevational view of a faucet connector constructed in accordance with a modification of this invention.

In the modified form of the invention illustrated in Figs. 4 and 5 a faucet connector is shown which is substantially identical to the form illustrated in the previous figures, distinguished merely in the fact that the body 10 is provided with a pair of lugs 16 on diametrically opposite sides, at the top thereof. These lugs 16 are preferably of solid cylindrical construction. They are intended as anchorage portions around which, or to which, an attaching chain or cord may be secured, whereby the connector may be more securely fastened to a faucet or valve.

While I have thus illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new and desire to secure by United States Letters Patent is:

1. In a detachable connector for coupling a tube or hose to a faucet or valve, a hollow body adapted to have attached to it a tube or hose at its bottom end, a flexible elastic material top wall across the top of said body and having an opening into which the end of the faucet or valve may engage, and a plurality of slightly spaced elastic ridges integral with said top wall and concentric about said opening with the innermost ridge adjacent the edge of said opening and said elastic material top wall and ridges serving to assist in gripping and holding due to their elasticity said faucet when engaged in said opening.

2. In a detachable connector for coupling a tube or hose to a faucet or valve, a hollow body adapted to have attached to it a tube or hose at its bottom end, a flexible elastic material top wall across the top of said body and having an opening into which the end of the faucet or valve may engage, and a plurality of slightly spaced elastic ridges integral with said top wall and concentric about said opening with the innermost ridge adjacent the edge of said opening and said elastic material top wall and ridges serving to assist in gripping and holding due to their elasticity said faucet when engaged in said opening, said ridges being on the top face of said top wall.

3. In a detachable connector for coupling a tube or hose to a faucet or valve, a hollow body adapted to have attached to it a tube or hose at its bottom end, a flexible elastic material top wall across the top of said body and having an opening into which the end of the faucet or valve may engage, and a plurality of slightly spaced elastic ridges integral with said top wall and concentric about said opening with the innermost ridge adjacent the edge of said opening and said elastic material top wall and ridges serving to assist in gripping and holding due to their elastcity said faucet when engaged in said opening, said concentric ridges being flared outward from the bottom to the top.

4. In a detachable connector for coupling a tube or hose to a faucet or valve, a hollow body adapted to have attached to it a tube or hose at its bottom end, a flexible elastic material top wall across the top of said body and having an opening into which the end of the faucet or valve may engage, and a plurality of slightly spaced elastic ridges integral with said top wall and concentric about said opening with the innermost ridge adjacent the edge of said opening and said elastic material top wall and ridges serving to assist in gripping and holding due to their elasticity said faucet when engaged in said opening, said ridges being on the bottom face of said top wall.

5. In a detachable connector for coupling a tube or hose to a faucet or valve, a hollow body adapted to have attached to it a tube or hose at its bottom end, a flexible elastic material top wall across the top of said body and having an opening into which the end of the faucet or valve may engage, and a plurality of slightly spaced elastic ridges integral with said top wall and concentric about said opening with the innermost ridge adjacent the edge of said opening and said elastic material top wall and ridges serving to assist in gripping and holding due to their elasticity said faucet when engaged in said opening, said ridges being on both the top and bottom faces of said top wall.

BEDFORD D. DAVIES.